United States Patent
Shanks et al.

(10) Patent No.: US 7,068,148 B2
(45) Date of Patent: Jun. 27, 2006

(54) METHOD FOR THE EFFICIENT READING OF A POPULATION OF RADIO FREQUENCY IDENTIFICATION TAGS WITH UNIQUE IDENTIFICATION NUMBERS OVER A NOISY AIR CHANNEL

(75) Inventors: Wayne Shanks, Baltimore, MD (US); Jens Arnold, Perry Hall, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 246 days.

(21) Appl. No.: 10/687,690

(22) Filed: Oct. 20, 2003

(65) Prior Publication Data
US 2004/0135674 A1    Jul. 15, 2004

Related U.S. Application Data

(60) Provisional application No. 60/419,091, filed on Oct. 18, 2002.

(51) Int. Cl.
*H04Q 5/22* (2006.01)

(52) U.S. Cl. .................................... 340/10.1; 340/10.2

(58) Field of Classification Search ............... 340/10.1, 340/10.2, 10.31, 10.4, 10.42, 10.5
See application file for complete search history.

(56) References Cited

U.S. PATENT DOCUMENTS

| 5,263,124 A | 11/1993 | Weaver et al. |
| 5,365,551 A * | 11/1994 | Snodgrass et al. ..... 340/825.21 |
| 5,841,770 A | 11/1998 | Snodgrass et al. |
| 6,118,789 A * | 9/2000 | Wood, Jr. ................... 370/462 |
| 6,532,305 B1 | 3/2003 | Hammen |
| 6,727,803 B1 * | 4/2004 | Hulvey ...................... 340/10.1 |
| 2002/0175805 A9 * | 11/2002 | Armstrong et al. ........ 340/10.2 |
| 2003/0137403 A1 * | 7/2003 | Carrender et al. ......... 340/10.4 |

OTHER PUBLICATIONS

Copy of International Search Report issued Jun. 7, 2004 for PCT/US03/33043, 5 pages.

* cited by examiner

*Primary Examiner*—Brian Zimmerman
*Assistant Examiner*—Clara Yang
(74) *Attorney, Agent, or Firm*—Sterne, Kessler, Goldstein & Fox P.L.L.C.

(57) ABSTRACT

A method for reading and tracking radio frequency identification (RFID) tags in the presence of a noisy air channel is provided. In accordance with the method, a binary tree data structure is used to characterize a plurality of RFID tags, each of which is associated with a unique identification (ID) number. During communication between a tag reader and one or more RFID tags, the tag reader traverses the binary tree, eliminating tags from communication until one tag with a unique ID number is isolated and verified. As the binary tree is traversed, counters associated with each node in the tree are incremented based on tag matches, such that, over time, counters associated with nodes in tag-populated branches will tend to have a high value and counters associated with nodes in unpopulated tree branches will tend to have low values. Where the read process is subject to noise and the tag reader is forced make a decision at a branching node, the tag reader makes a branch prediction based on the current value of the node counters associated with each of the possible alternative branches.

26 Claims, 9 Drawing Sheets

METHOD FOR THE EFFICIENT READING OF A POPULATION OF RADIO FREQUENCY IDENTIFICATION TAGS WITH UNIQUE IDENTIFICATION NUMBERS OVER A NOISY AIR CHANNEL

CROSS-REFERENCE TO RELATED APPLICATIONS

This application claims priority to U.S. Provisional Application No. 60/419,091, entitled "Method for the Efficient Reading of a Population of Radio Frequency Identification Tags with Unique Identification Numbers Over a Noisy Air Channel," filed Oct. 18, 2002, which is hereby incorporated by reference in its entirety.

FIELD OF THE INVENTION

The present invention is related to methods for communicating between radio frequency identification (RFID) tags and an RFID reader.

BACKGROUND OF THE INVENTION

In an RFID system, an RFID reader may be required to distinguish between and communicate with a large number of different RFID tags within a given communication range. Where each of the different RFID tags is identified by a unique identification number, it is imperative that the RFID reader be able to quickly and accurately read the identification number associated with each tag. However, when the communication channel between the RFID reader and tags becomes corrupted by noise, the ability of the RFID reader to quickly and accurately identify the RFID tags may be impaired.

Previous RFID readers typically use some variation of an algorithm for reading a population of RFID tags. The algorithm seeks to sequentially read the tags ordered from strongest to weakest return signals. After each RFID tag is read, it is shut down. No information is carried over from tag read to tag read. Although this technique is simple to implement in the RFID reader, it is not very robust in the presence of noise.

One major application of RFID systems is electronic inventory. In modern business, maintaining an accurate inventory of merchandise is crucial. In the past, taking inventory was an entirely manual process, and therefore slow and expensive. In an RFID electronic inventory system, an RFID tag is attached to each item to be inventoried. Each RFID tag is assigned a unique tag identification number.

In a typical application, multiple tagged items are stacked on a pallet. Readers are located at various points in the distribution chain to read and inventory the tagged items. For example, one or more readers may be located at a dock door. As the pallet moves through the dock door, a reader interrogates the population of tags on the pallet. Tags on items in the interior of the stack tend to have weaker signals than exterior tags due to their signals having to pass through more items of the pallet than exterior tags. As a result, the signals of interior tags may be difficult to read. In addition, many of the RFID inventory applications operate in noisy RF environments.

Consequently, a need therefore exists for an alternative technique that permits an RFID reader to efficiently read a population of RFID tags in a manner that is robust to noise and that optimally utilizes past information gained by the RFID reader, other RFID readers, or other systems compiling information for RFID readers, during or before the reading process.

A further need exists for a method of communicating between an RFID reader and a population of RFID tags that maximizes the read rate and accuracy of weakly responding RFID tags.

BRIEF SUMMARY OF THE INVENTION

The present invention is directed to a system and method for the efficient reading of a population of radio frequency identification (RFID) tags with unique identification numbers over a noisy channel. In accordance with aspects of the present invention, the RFID system includes one or more readers, each reader having a processing module and a memory. The memory stores a set of information about each node in a binary tree data structure (binary tree). The set of information includes an activity register, a "0" bit counter, and a "1" bit counter. Other characteristics of the node, such as path length at the node, may also be stored.

In a further aspect, the processing module includes logic. The logic permits an RFID reader to efficiently read a binary tree characterizing a collection of RFID tags having unique identification numbers within communication range of the reader. In an aspect of the present invention, when the reader receives one or more response signals from a population of tags, the reader adjusts the information stored for the current node being traversed. If only a "0" was received, the reader increments the activity register value, increments the "0" counter, and decrements the "1" counter. If only a "1" was received, the reader increments the activity register value, increments the "1" counter, and decrements the "0" counter. If both were received, the reader increments both counters and the activity register. In addition, the reader also evaluates the stored node information to determine which branch in the binary tree to traverse to optimize the efficiency of the read cycle.

The present invention is also directed to a system and method for identifying a valid tag in the presence of errors introduced during binary tree traversal using error detection code processing. In accordance with an aspect of the present invention, during binary tree traversal, the reader determines that one or more bit positions in the tag identification number are potentially corrupted. Using this information, the reader determines a set of potentially valid identification numbers. For each potential identification number, the reader calculates an error detection code value. The reader then determines whether a calculated error detection code value matches the error detection code value received from the tag being read. If a calculated value matches, the associated identification number is the valid tag identification number.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
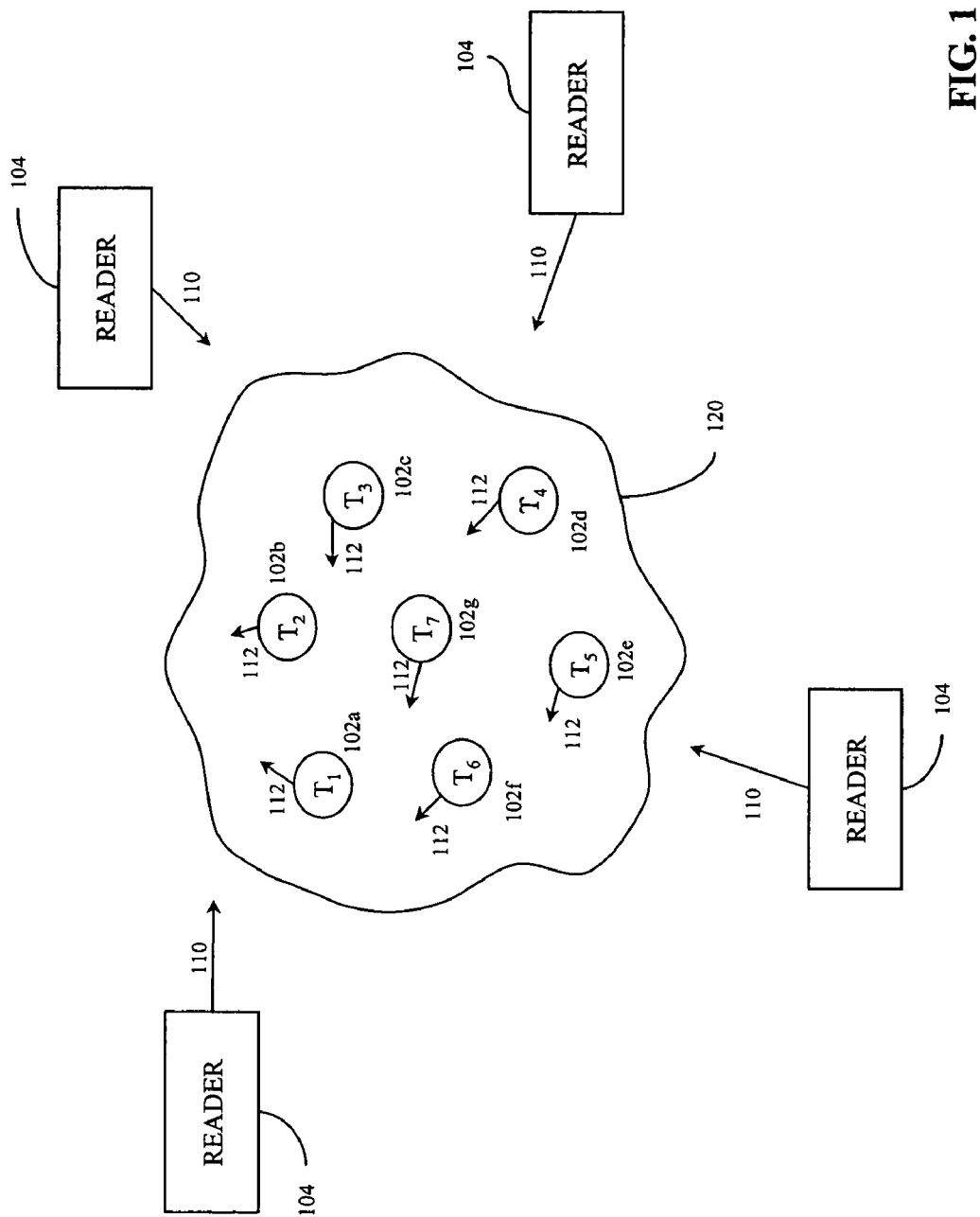
FIG. 1 is a block diagram of an environment where one or more tag readers communicate with one or more tags, according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Introduction

1.1 Tag Interrogation Environment

Before describing the present invention in detail, it is helpful to describe an example environment in which the invention may be implemented. The present invention is particularly useful in radio frequency identification (RFID) applications operating in noisy environments. FIG. 1 illustrates an environment 100 where one or more RFID tag readers 104 communicate with an exemplary population of RFID tags 120, according to the present invention. As shown in FIG. 1, the population of tags 120 includes seven tags 102a–102g. According to embodiments of the present invention, a population of tags 120 may include any number of tags 102. In some embodiments, a very large number of tags 102 may be included in a population of tags 120, including hundreds, thousands, or even more.

Exemplary environment 100 also includes one or more readers 104. These readers 104 may operate independently or may be coupled together to form a reader network, as shown in FIG. 2. A reader 104 may be requested by an external application to address the population of tags 120. Alternatively, the reader may have internal logic that initiates communication. When the reader is not communicating with the population of tags, the reader 104 typically does not emit RF energy. This allows other readers to act upon the same population of tags, but from a different orientation, so as to achieve as complete of coverage with RF signals into the entire population of tags as possible. In addition, the same reader may act upon the same population of tags using a different frequency to increase tag coverage.

According to the present invention, signals 110 and 112 are exchanged between a reader 104 and the tags 102 according to one or more interrogation protocols. An exemplary interrogation protocol is the binary tree traversal protocol described below. Signals 110 and 112 are wireless signals, such as radio frequency (RF) transmissions. Upon receiving a signal 110, a tag 102 may produce a responding signal 112 by alternatively reflecting and absorbing portions of signal 110 according to a time-based pattern or frequency. This technique for alternatively absorbing and reflecting signal 110 is referred to herein as backscatter modulation. The present invention is also applicable to RFID tags that communicate in other ways.

Figure 2A:
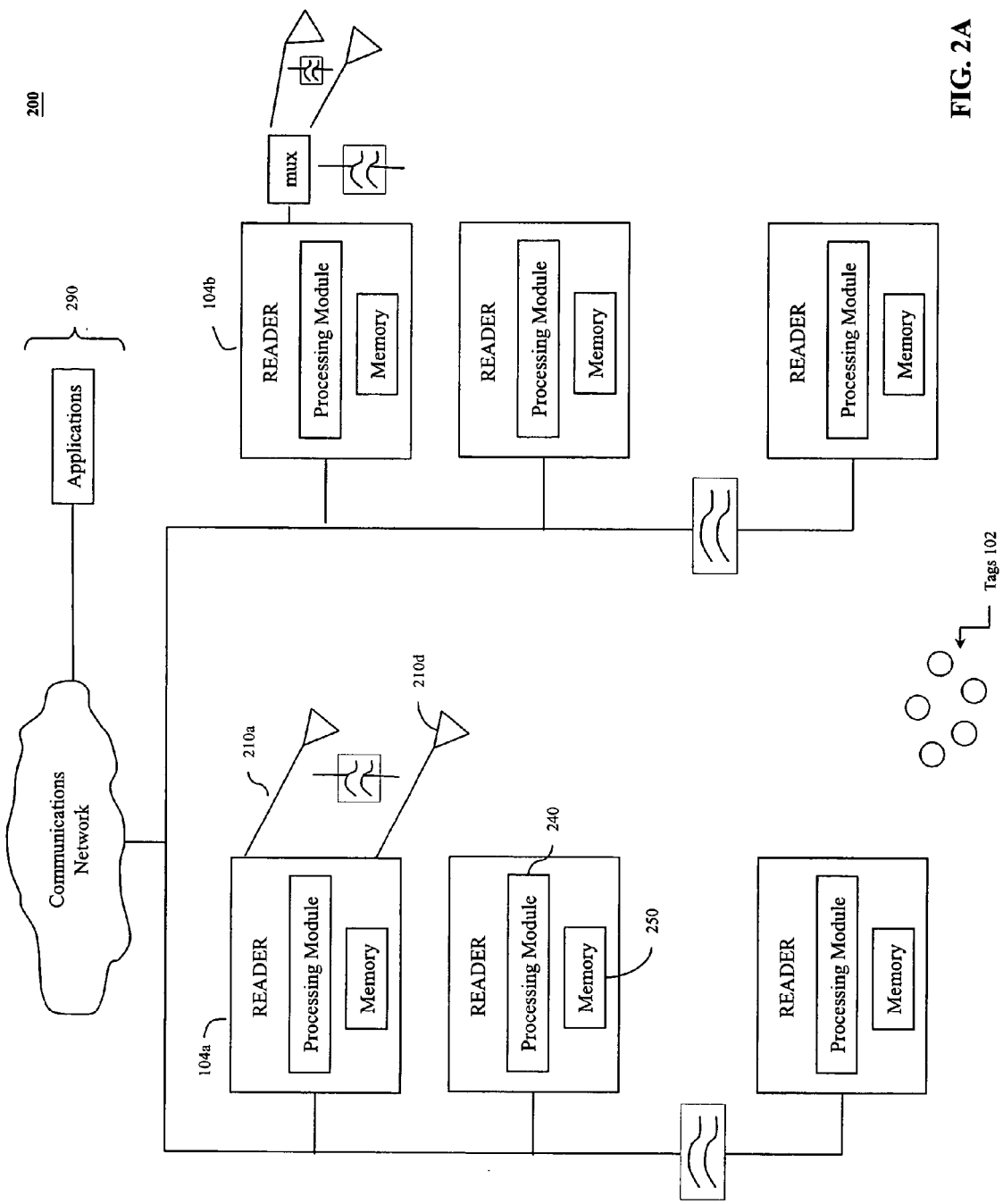
FIG. 2A is a block diagram illustrating an architectural overview of communication between one ore more readers and one or more tags, according to an embodiment of the present invention.

FIG. 2A is a block diagram of an example RFID system 200 providing communications between one or more readers 104 and tags 102, according to an embodiment of the present invention. RFID system 200 includes a user application domain 250, a network of readers 104a–n, and one or more tags 102. Note that the invention is applicable to a single reader, as well as to a plurality of readers coupled in a network, as shown in FIG. 2. Hence, although "reader" is often referred to herein, it should be understood that the present invention is applicable to any number of readers in any configuration as required by a particular application.

Each reader 104 communicates with a tag 102 via one or more antenna(e) 210. A variety of antenna configurations are available. For example, in an embodiment, reader 104a can be directly connected to up to four antennas (e.g., antennas 210a–210d). In another example embodiment, reader 104b is coupled to and controls a multiplexer. A multiplexer allows for a greater number of antennas to be switched to a single antenna port of the reader. In this way reader 104b may accommodate a greater number of antennae.

User application domain 290 may include one or more user applications. User applications may communicate with one or more readers 104 via a communications network or data link. At a high level, a reader may receive requests regarding one or more tags 102 from the user application domain 290. For example, an application may request a reader 104 interrogate a population of tags.

Figure 2B:
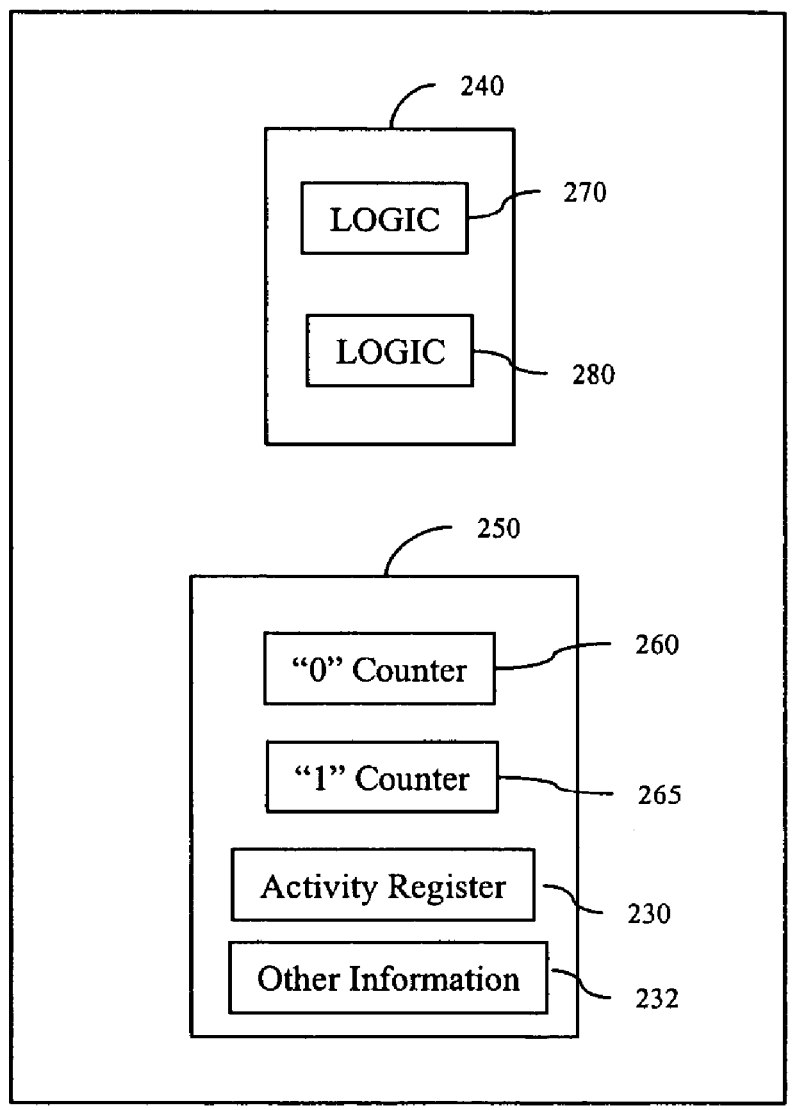
FIG. 2B is a block diagram of an illustrative reader according to an embodiment of the present invention.

Each of the readers 104a–n includes a processing module 240 and a memory 250. FIG. 2B is a block diagram of an illustrative RFID reader 104 according to an embodiment of the present invention. As shown in the example embodiment of FIG. 2B, processing module 240 may include logic 270 to determine a traversal path based on node information stored in memory 250. Logic 270 permits an RFID reader to efficiently read a binary tree characterizing a collection of RFID tags having unique identification numbers within communication range of the reader. Reading all the tags within the tag population during a read cycle results in the repeated passage through bit sequences that are common to multiple tags. Furthermore, a reader generally performs multiple read cycles on a tag population. Therefore, even the unique identification number of a tag is read multiple times. The processing logic of the present invention does not discard information gathered during these repeated passages through the binary tree. Instead, the reader compiles information representing the occupation of each node in the binary tree. Because random noise at a particular node over many samples will average to zero and systematic signals will not, the signal-to-noise ratio for any bit in the binary tree is improved by averaging over many trials. This reader logic can improve the read rate for tags by as much as an order of magnitude at very high bit rates.

In addition, processing module 240 may also include logic 280 to identify a tag identification number based on error detection processing.

Memory 250 stores data associated with tag population 120. In an embodiment, memory 250 is configured to store two registers/counters for every node in the binary traversal tree. A first counter 260 stores the weight of the "1" symbol and a second counter 265 stores the weight of the "0" symbol at the node. In addition, memory 250 is configured to store an activity register 230 for each node in the binary traversal tree.

In an embodiment, memory 250 is configured to store information only for nodes in the binary tree that are utilized. For example, for each node in a populated path, memory 250 is configured to store one or more counters. Other options for storing tag population data in memory 250 exist as would be appreciated by a person skilled in the relevant art(s).

Methods for implementing the storage of node specific information may vary depending on the implementation and architecture of reader 104. Examples of storage implementations include one or more data arrays or a linked list. Other options for storage exist as would be appreciated by a person skilled in the relevant art(s).

Furthermore, note that the use of the terminology "counter" is not intended to imply a specific implementation. Each counter can be implemented as a register or in another manner including hardware, software, firmware, or any combination thereof.

The data regarding tag population 120 stored in memory 250 may be shared with other readers 104 or with other applications. For example, reader 104a may share its compiled data associated with tag population 120 (e.g., weighted tree information) with reader 104b. The compiled data may also be stored in a database in user domain 290 or other location. In an embodiment, the compiled knowledge associated with tag population 120 or an index to a location containing that knowledge is stored on a separate device such as a tag 102 or a bar code. For example, a bar code may contain an index to the storage location of the tag population data. In an embodiment, reader 104 (or an application) can pre-load its memory 250 with data regarding tag population 120 stored in another reader 104, in a database, or in another device.

Figure 3:
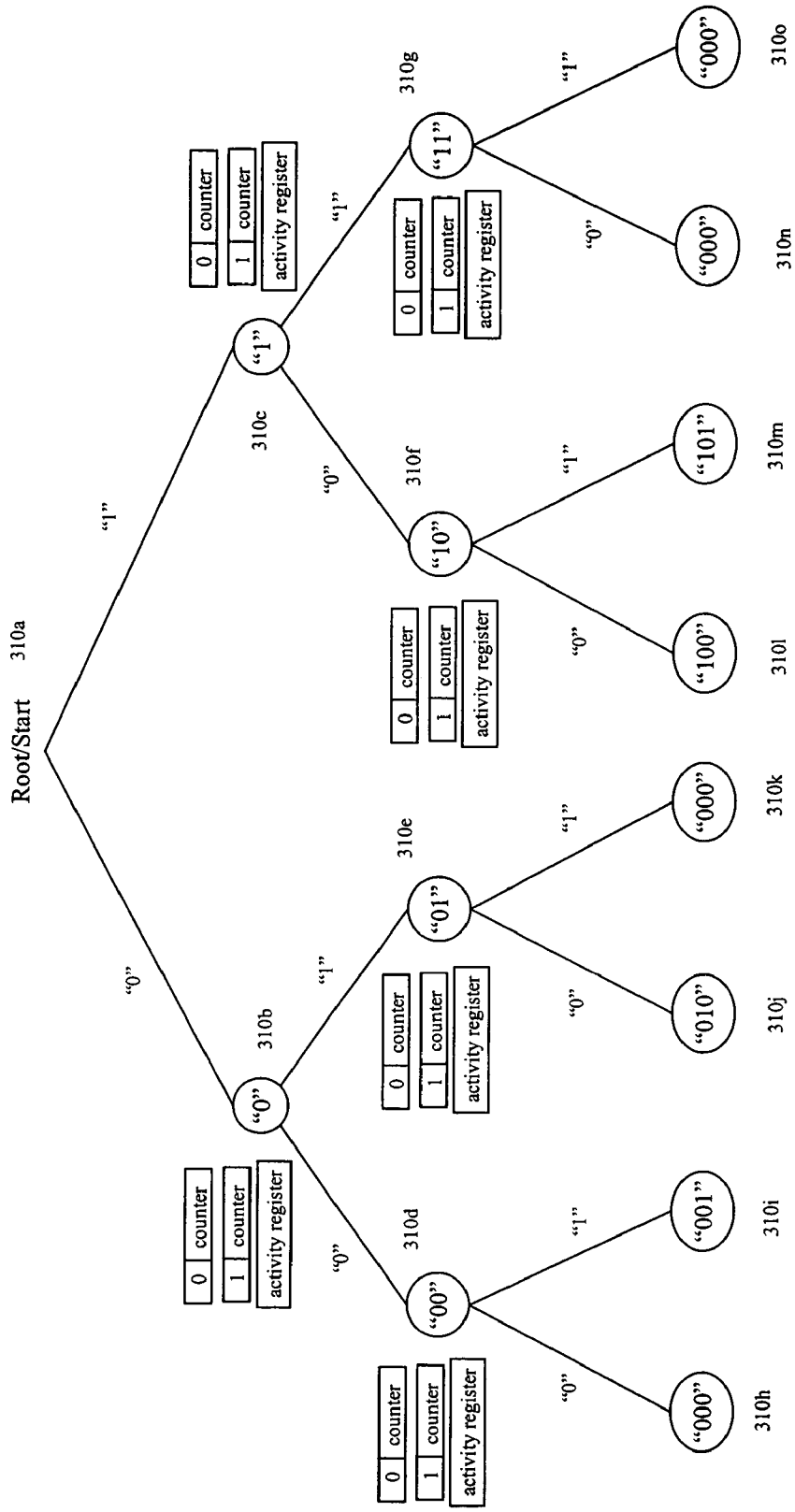
FIG. 3 is a diagram of an exemplary binary tree having information associated with each node in accordance according to embodiments of the present invention.

FIG. 3 illustrates a logical representation of an example set of node data stored in memory 250. FIG. 3 shows a binary traversal tree 300 having three levels below the root level, where each level corresponds to a bit position in the tag identification number. Note that three levels are shown for illustrative purposes, and that the present invention is applicable to any size set of node data. The binary tree has 14 nodes 310a–o. Each node may have an associated "0" counter 265 and "1" counter 260, as described above. Each node may also contain an activity register. In addition, other parameters characterizing the node, such as length of traversal path at that node, may be stored. Two branches extend from each node except the nodes at the lowest level of the tree (nodes 310h–310o). For each branch pair, the "0" branch descends towards the left, and the "1" branch descends towards the right.

In an embodiment, the value of the "0" counter 265 at a node is incremented each time the reader receives a "0" symbol while traversing the node. The value of the "0" counter 265 at a node is decremented each time the reader does not receive a "0" symbol while traversing the node. Similarly, the value of the "1" counter 260 at a node is incremented each time the reader receives a "1" symbol while traversing the node. The value of the "1" counter 260 at a node is decremented each time the reader does not receive a "1" symbol while traversing the node. In alternate embodiments, the counters may be incremented or decremented in other ways to track received symbols, as would be understood to persons skilled in the relevant art(s).

In an embodiment, the activity register, when present, can be used to detect unused or dormant portions of a binary tree. For example, in an embodiment, the activity register is incremented each time the node is traversed during a read cycle of the tag population. Outside the binary tree negotiations, at a predetermined interval that is set for the application, all activity registers in the tree are decremented. Nodes with activity registers that fall below a minimum threshold value are marked as dead and are now available for re-assignment to new or other branches of the tree. In this way, the binary tree and the information in the tree grow and evolve in a continuous fashion with the RFID population.

As will be appreciated by persons skilled in the relevant art(s), the present invention can be implemented on a variety of reader platforms and reader network configurations.

1.2 Interrogation Protocol

In accordance with an embodiment of the present invention, a binary tree traversal methodology is used in order to establish communication between a reader 104 and one of a population of tags 120 that are within the communication range of the reader. In accordance with such an embodiment, each tag 102 is identified by a unique identification number. The layout of an example unique tag identification number is shown below.

| tag identification number | error detection code |
|---|---|

Each unique tag identification number has embedded tag identification bits and error detection code bits. For example, each unique tag identification number may have ninety-six (96) bit identification number and a 16-bit error detection code value. However, the present invention is applicable to other tag identification number lengths and error detection code lengths. Throughout this document, the embedded tag identification number (e.g., 96 bit number) is referred to as the tag identification number.

In an embodiment, contention between the tags 102 is avoided by requiring transmissions from each tag 102 to the reader 104 to be unique in a separation of frequency, but can be avoided in other ways. Contention may be defined as communications by multiple transmissions in the same frequency, time, and/or phase that thereby destructively interfere with each other's attempted transmission. Thus, in an example binary traversal algorithm, one bit of information is negotiated at a time between the reader 104 and the current population of tags 102 that the reader is addressing. Each tag response is defined by two frequencies, one frequency for 0, and the other frequency for 1. In such a manner, many tags can simultaneously and non-destructively communicate a data 0. It is not important that the reader cannot differentiate a single data 0 from multiple data 0's, just that there exists a data 0. Alternatively, for example, a tag response may be defined by two time periods, one time period for "0", and the other for "1."

In an embodiment, the binary tree traversal process eliminates tags from communication until only one tag with a unique number is isolated and verified. As described above, each level in the binary tree represents a bit position in the tag identification number. As the reader proceeds through nodes (and levels) in the binary tree, it directs a subset of the population of tags to remain active and a subset of the population of tags to go inactive. For example, tags that last sent a matching bit remain active; those that did not will go inactive. Statistically, on each bit exchange, one half of the tag population will go inactive. This process continues until the reader reaches a node in the last level of the binary tree and results in a unique tag isolation and elimination. This process is repeated until each tag in the population of tags is isolated.

For more information concerning binary tree traversal methodology, see the following co-pending U.S. patent applications, each of which is incorporated by reference in its entirety: application Ser. No. 10/072,885, filed Feb. 12, 2002, entitled "Method, System and Apparatus for Binary Traversal of a Tag Population,"; and application Ser. No. 10/073,000, filed Feb. 12, 2002, entitled "Method, System and Apparatus for Communicating with a RFID Tag Population,". For more information concerning communication between an RFID reader and a population of RFID tags, see U.S. Pat. No. 6,002,344, entitled "System and Method for Electronic Inventory" which is incorporated herein by reference in its entirety and application Ser. No. 09/323,206, filed Jun. 1, 1999, entitled "System and Method for Electronic Inventory," which is incorporated herein by reference in its entirety.

2. Binary Tree Traversal Using Traversal Path Weighting

Figure 4:
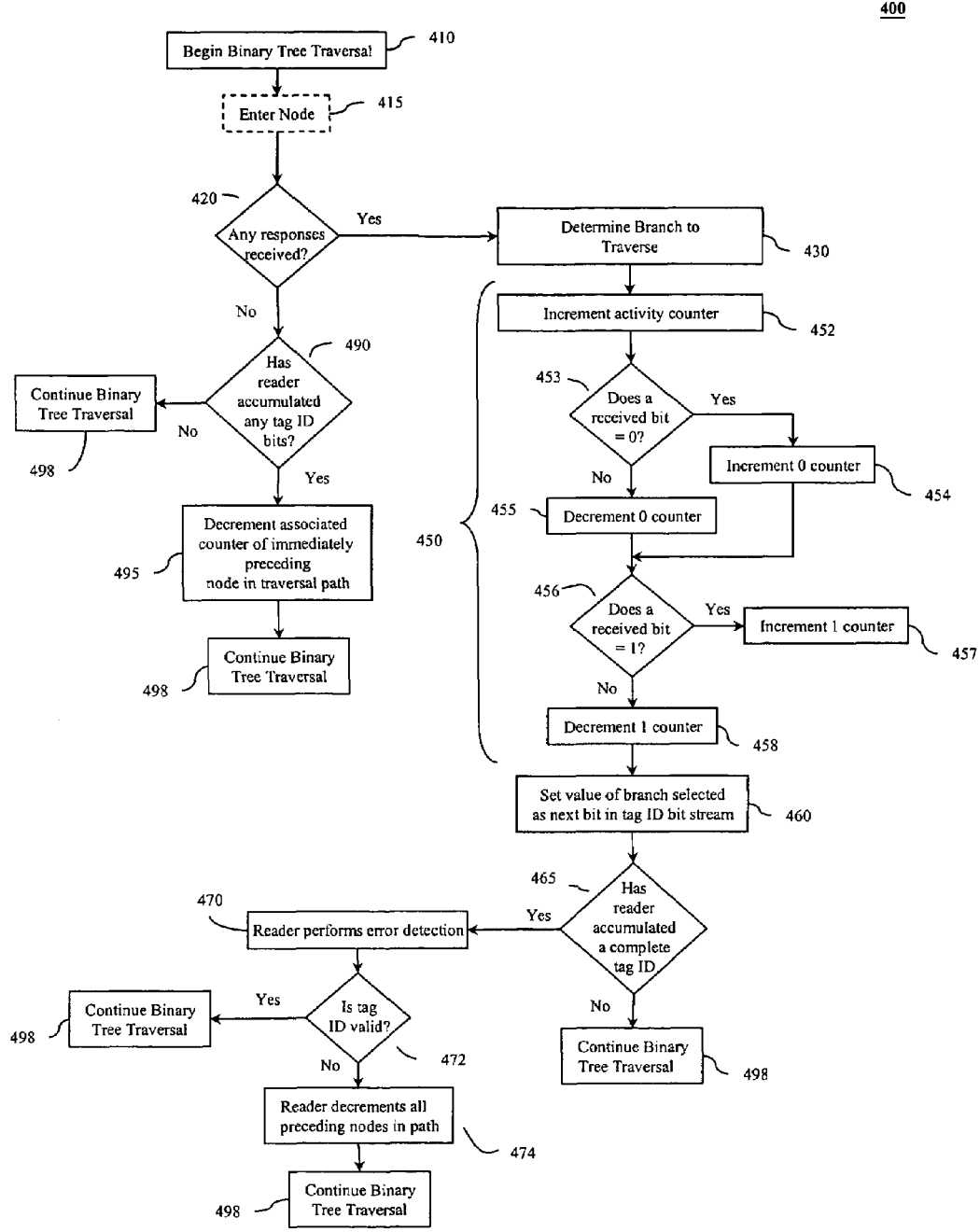
FIG. 4 is a flowchart of a read interrogation operation using traversal path weighting from the perspective of the reader, according to embodiments of the present invention.

FIG. 4 is a flowchart 400 depicting the operation of the present invention according to an example embodiment. The flowchart illustrates the present invention's use of traversal path weighting to increase the efficiency of an interrogation of a population of tags. The present invention works conjointly with the binary tree traversal protocol used by the reader. Examples of binary tree traversal protocols are described above. Flowchart 400 will be described with continued reference to the example environment in FIG. 2, above. However, the invention is not limited to that environment. Note that some steps shown in flowchart 400 do not necessarily have to occur in the order shown.

Flowchart 400 begins at step 410 when reader 104 begins binary tree traversal of the tag population 120. The present invention can be used with any binary tree traversal interrogation technique. Example interrogation techniques include the general read technique (also referred to as a full field read), the specific read technique, and the group read technique. A general read technique involves reading every tag in a tag population that can be detected. A specific read technique traverses the tag population using a particular bit pattern. A group read technique is a hybrid of the specific read and general read techniques.

After a binary tree traversal is started, in step 415, the reader enters a node of the binary tree (e.g., shown in FIG. 3 as one of the nodes 310a–o). As part of binary traversal protocol, at each node in the binary tree, the reader transmits a signal to initiate a response from the population of tags. In a typical binary tree traversal protocol, the response contains a symbol representing a bit in the identification number of at least one tag.

In step 420, the reader determines whether any responses have been received from the population of tags. If no responses have been received, operation proceeds to step 490. If any response has been received, operation proceeds to step 430.

Figure 5A:
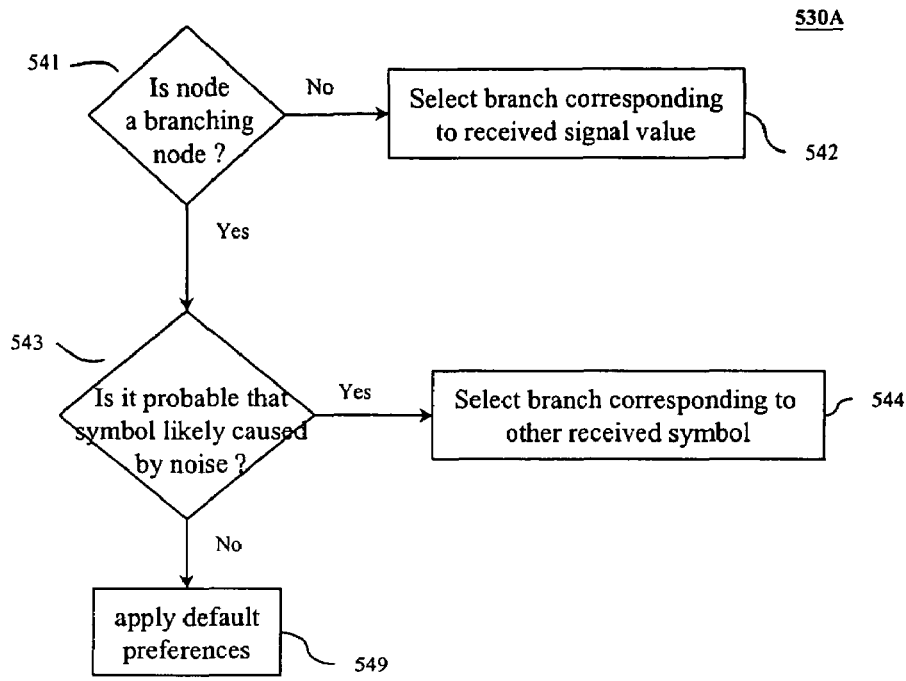
FIG. 5A is a flowchart illustrating a method for determining the next reader bit in accordance with embodiments of the present invention.

In step 430, the reader determines which branch to traverse (i.e., which bit to accumulate as the next bit in the read tag identification number). As an example embodiment for step 430, FIG. 5A depicts a flowchart 530A for determining which branch to traverse. A reader may use the method of flowchart 530A when a determination is made that the probability exists that the read process is subject to noise, for example. Flowchart 530A uses traversal path weighting to isolate tag responses in the presence of noise.

In step 541, the reader determines whether the current node is a branching node. A branching node is a node at which both a "0" response value and a "1" response value have been received and the reader must decide which branch to traverse. If the node is not a branching node (i.e., only one response value was received), operation proceeds to step 542. If the node is a branching node (i.e., both response values were received), operation proceeds to step 545.

In step 542, the reader selects the branch corresponding to the received signal value and operation proceeds to step 452.

In step 543, the reader determines whether it is probable or likely that one or both of the received signals were caused by noise or some other problem. The reader bases this determination on an evaluation of the node information stored in memory 250. For example, because the reader may pass through a particular node many times during a read cycle, counters 260 and 265 associated with branches in a tag populated path will have high values over time, while unpopulated branches will have counters 260 and 265 with relatively low values over time. Consequently, counters 260 and 265 can be used as a weighting factor during the determination step. For example, if "1" counter 260 is highly positive while "0" counter 265 is highly negative or zero, then reader 104 determines that it is probable that the "0" symbol was caused by noise and therefore selects the positive weighted "1" branch to traverse. The reader may also consider the length of the traversal path (i.e., the number of nodes traversed prior to this node) at the node as a possible indication of a false path.

In step 549, if the reader determines the probability or likelihood is that neither signal was caused by noise in step 543, the reader applies a default preference technique to select a branch to traverse. For example, the reader may have a default preference for the strongest signal. Alternatively, the reader may have a default preference for a particular bit value, such as a bit "0" or a bit "1."

In step 544, if the reader determines that the probability or likelihood is that one received symbol was likely caused by noise in step 543, the reader selects the branch corresponding to the other received signal value. This technique can increase the likelihood that a valid tag will be found on the path. Because of the transient nature of noise, the probability that noise will exist at the same node during a subsequent traversal is very small. Therefore, if the reader reaches the same node during a later traversal, the noise signal is less likely to exist at the node. Thus, the reader increases efficiency by not erroneously traversing unpopulated paths because of noise.

If the reader determines the probability or likelihood is that both received symbols were likely caused by noise, the reader may elect to terminate traversal of the path and start traversal of another path. Alternatively, the reader could select a branch to traverse (similar to step 544) and control passes to step 452. If both signals were noise, tag response will "drop out" at the next node.

Figure 5B:
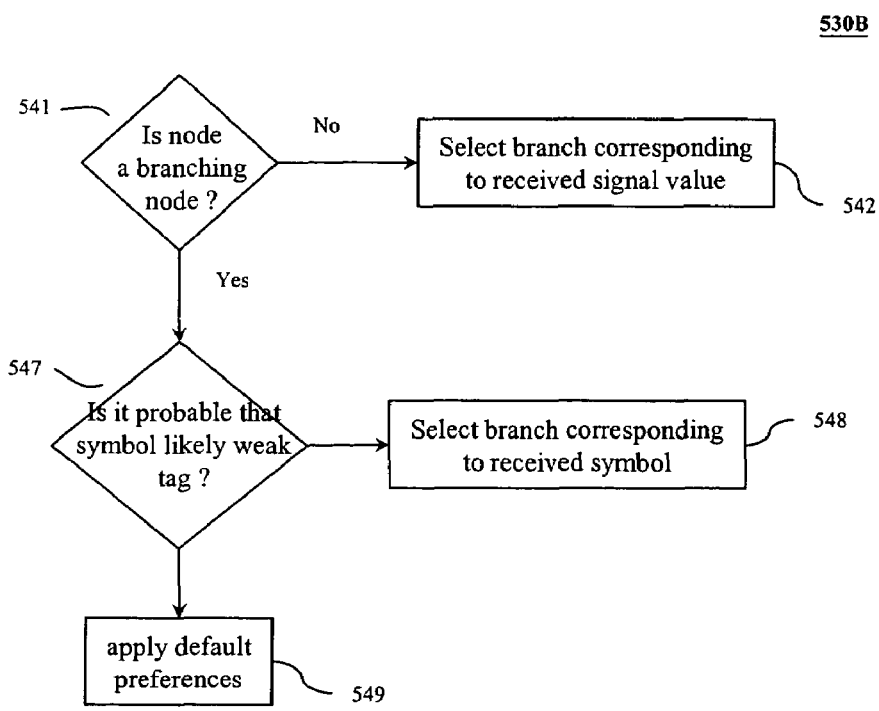
FIG. 5B is a flowchart illustrating an alternative method for determining the next reader bit in accordance with embodiments of the present invention.

FIG. 5B depicts a flowchart 530B for determining the next reader bit value, in an alternate embodiment of the present invention for step 430. A reader may use the method of flowchart 530B when a determination is made that the probability that the read process is subject to noise is low or non-existent, for example. Flowchart 530B uses traversal path weighting to isolate and read weak or unread tags. A weak tag may be a tag whose signal is difficult to read.

Steps 541 and 542 are identical to steps 541 and 542 described above in reference to flowchart 530A. In step 541, the reader determines whether the current node is a branching node. If the node is not a branching node (i.e., only one response value was received), operation proceeds to step 542. If the node is a branching node (i.e., both response values were received), operation proceeds to step 547.

In step 542, the reader selects the branch corresponding to the received signal value and operation proceeds to step 452.

In step 547, the reader determines whether it is probable or likely that one or both of the received signals were from weak or unread tags. The reader bases this determination on an evaluation of the node information stored in memory 250. For example, if the "1" counter 260 is highly positive while the "0" counter is highly negative or zero, then the reader determines that it is probable that the received "0" signal is from a weak tag and selects the "0" branch to traverse.

If in step 547 the reader determines the probability or likelihood is that one received symbol was likely from a weak tag, operation proceeds to step 548. In step 548, the reader selects the branch corresponding to the received signal value for the weak tag.

If in step 547 the reader determines the probability or likelihood is that neither signal was from a weak tag, operation proceeds to step 549.

In step 549, the reader applies a default preference technique to select a branch to traverse. For example, the reader may have a default preference for the strongest signal. Alternatively, the reader may have a default preference for a particular bit value, such as a bit "0" or a bit "1."

After completion of flowchart 530A or 530B, operation proceeds to step 452. In step 452, the reader increments the activity register (if either a "0" or a "1" symbol was received in step 420).

In step 453, if a received bit equals 0, operation proceeds to step 454. In step 454, the reader network increments "0" counter 265 for the node and operation proceeds to step 456. In step 453, if a received bit does not equal 0, operation proceeds to step 455. In step 455 the reader network decrements "0" counter 265 and operation proceed to step 456.

In step 456, if a received bit equals 1, operation proceeds to step 457. In step 457, the reader network increments "1" counter 260 for the node and operation proceeds to step 460. In step 456, if a received bit does not equal 1, operation proceeds to step 458. In step 458, the reader network decrements "1" counter 260 for the node and operation proceeds to step 460.

In an embodiment of the present invention, "1" counter 260 and "0" counter 265 can reflect negative values. In an alternate embodiment, "1" counter 260 and "0" counter 265 are held at 0 when a decrementing step would cause the counter to have a negative value. Note that while steps 452–458 depict the reader first checking for a 0 bit then checking for a 1 bit, the reader can perform these steps in the any order or in parallel without departing from the spirit or scope of the present invention. In an alternative embodiment of the present invention, the adjustment of the node information (steps 450–458) can occur before the reader determines which branch to traverse (step 430).

In step 460, reader 104 accumulates the reader bit as the next bit in the tag identification stream. During successive performances of step 460, reader 104 builds a current tag identification number bit stream.

In step 465, the reader determines whether a complete tag identification number has been accumulated. If the tag identification number is not complete, operation proceeds to step 498 and the reader continues binary tree traversal.

If a complete identification number has been accumulated, operation proceeds to step 470. In step 470, the reader performs error detection processing to determine whether a valid tag has been read. In an embodiment of the present invention, the error detection processing is cyclic redundancy check (CRC) processing. CRC is a common error detection protocol used in data communications applications. Other error detection protocols can be used as would be appreciated by a person skilled in the relevant art(s).

In step 472, if the tag identification number is valid, operation proceeds to step 498. In step 472, if the tag identification number is not valid, an invalid tag identification number has been accumulated and operation proceeds to step 474. Although steps 470 and 472 are represented as distinct steps, they can be performed simultaneously by the reader.

In step 474, the reader decrements the appropriate counters in all preceding nodes in the current traversal path. Operation then proceeds to step 498.

During a binary tree traversal, the reader may receive no responses from a tag population when either no more tags remain to be read or where noise briefly causes an unpopulated branch of the binary tree data structure to appear populated. In step 490, when no responses were received from the population of tags, the reader determines whether any tag identification bits have been accumulated during the current traversal. If no tag identification bits have been accumulated, operation proceeds to step 498.

If the reader determines that tag identification bits have been accumulated in step 490, the reader assumes that the reader proceeded down an incorrect path in the binary tree. This "drop out" of tag response due to an incorrect path will most likely occur directly after the node where the first incorrect branch was taken. Therefore, in an embodiment of the present invention, in step 495, the reader decrements the weight of the counter corresponding to the incorrect path at the node immediately preceding the drop out. In alternate embodiments, the reader may decrement counters at additional nodes in the traversal path such as nodes prior to where the incorrect branch was taken. After the counter is adjusted, operation proceeds to step 498.

In step 498, reader 104 resumes binary tree traversal. The resumption of binary tree traversal may occur at various points in the binary tree traversal protocol. For example, when a complete valid tag identification number has been received, reader 104 may resume binary tree traversal at a command processing point. Alternatively, when an invalid tag identification number is received or a partial tag identification number has been received, the reader may restart binary traversal at the start/root node. Reader 104 may also proceed to the next node in the binary tree when additional bits in the tag identification number remain to be accumulated.

When interrogation of the tag population has been completed (e.g., binary tree traversal is complete), reader 104 may clear the bit counters at each node. Alternatively, reader 104 may continue to store the counter values for a fixed time period or for a fixed number of read cycles. For example, if reader 104 is performing a second read of the same population of tags, reader 104 may use the counter values from the first read cycle and increment or decrement these values.

In an embodiment, reader 104 can also load information associated with tag population 120 into memory 250 prior to processing. This tag population information can be obtained from another reader 104 or from a database in user domain 290.

As will be readily appreciated by persons skilled in the relevant art(s), the above-described methods of reading and tracking RFID tags in accordance with embodiments of the present invention can be adapted to systems that ask for and accept the unique ID numbers of all tags in the RFID reader field (polling), or to systems that seek to determine when RFID tags pass in or out of the RFID reader field (event report).

Another technique for the efficient reading of tags identifies and stores bit sequences that are common among the identification numbers of the tags onto a stack, which are sequentially pulled off the stack and read out. For example, reader 104 may accumulate the first n bits of a tag identification number. While negotiating the next bit position, the reader may receive two symbols from the tag population. The reader will select a branch associated with one symbol to traverse. The reader will then store the bit sequence associated with the other symbol on the stack. This stacking is performed each time a branching node is reached by the reader. Because a bit sequence pulled off the stack is forced out, those bits are less susceptible to bit errors. This technique is complex but is robust to noise. However, this "stack" technique does not optimally utilize all the information gained by an RFID reader during the process of reading a population of RFID tags.

Another technique for efficient reading of tags uses a stored traversal path after a "drop out" of tag responses occurs during a binary tree traversal. In this technique, after the "drop out" of responses, the reader retrieves the stored traversal path accumulated during the binary tree traversal. The reader then communicates each bit of the stored traversal path to the readers during a new "modified" binary tree traversal. While negotiating the bits in the stored traversal path, the reader ignores responses from the tags and proceeds through the stored traversal path. This continues until the reader has traversed the nodes associated with all the bits in the stored path or has traversed the nodes associated with a subset of bits. The reader then resumes standard binary tree traversal for the remaining bits to be accumulated.

3. Tag Identification Using Error Detection Processing

In a noisy operating environment, the accumulated tag identification number for a tag may be corrupted by noise during the read process. As a result, the error detection code value received from the tag will not match the error detection code value calculated by the reader using the accumulated tag identification number. In common tag interrogation protocols, the reader will not know which bit or bits in the identification number were corrupted. In these protocols, the reader discards the entire identification number and must perform the tag read process one or more additional times to identify the tag.

Figure 6:
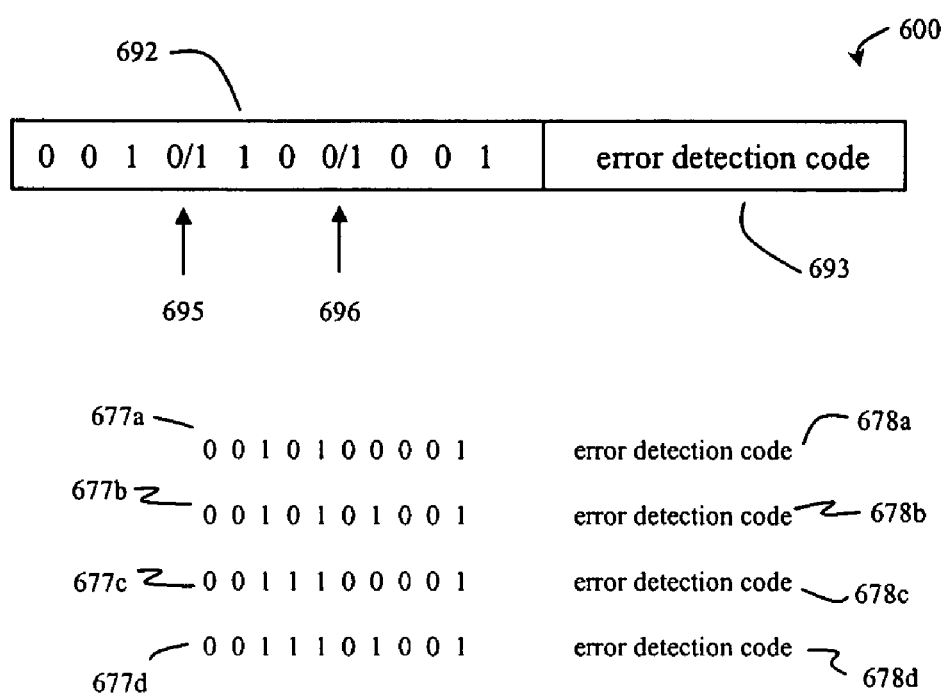
FIG. 6 is a diagram of an exemplary tag having bit positions corrupted by noise.

In the present invention, the reader can determine which bit or bits have been potentially corrupted by noise. The reader can use this knowledge to correctly identify an individual tag without performing another read process. FIG. 6 illustrates an exemplary tag having a 10-bit identification number 692 and an error detection code value 693. During the read process, the reader has identified two bit positions 695 and 696 that have been potentially corrupted by noise (as indicated in FIG. 6 as having both 0 and 1 values). Thus, the reader can determine that the valid tag has one of four potential 10-bit identification numbers 677a–d due to the four possible combinations of the two unknown bits. Each of the four potential 10-bit identification numbers 677a–d has an associated error detection code value 678a–d. The error detection code values 678a–d are calculated by the reader 104. The valid tag identification number can then be identified by matching the error detection code value 693 received from the tag as part of the read process to an error detection code value 678a–d. The identification number 677a–d associated with the matched error detection code value is indicated by the reader as the valid identification number.

Figure 7:
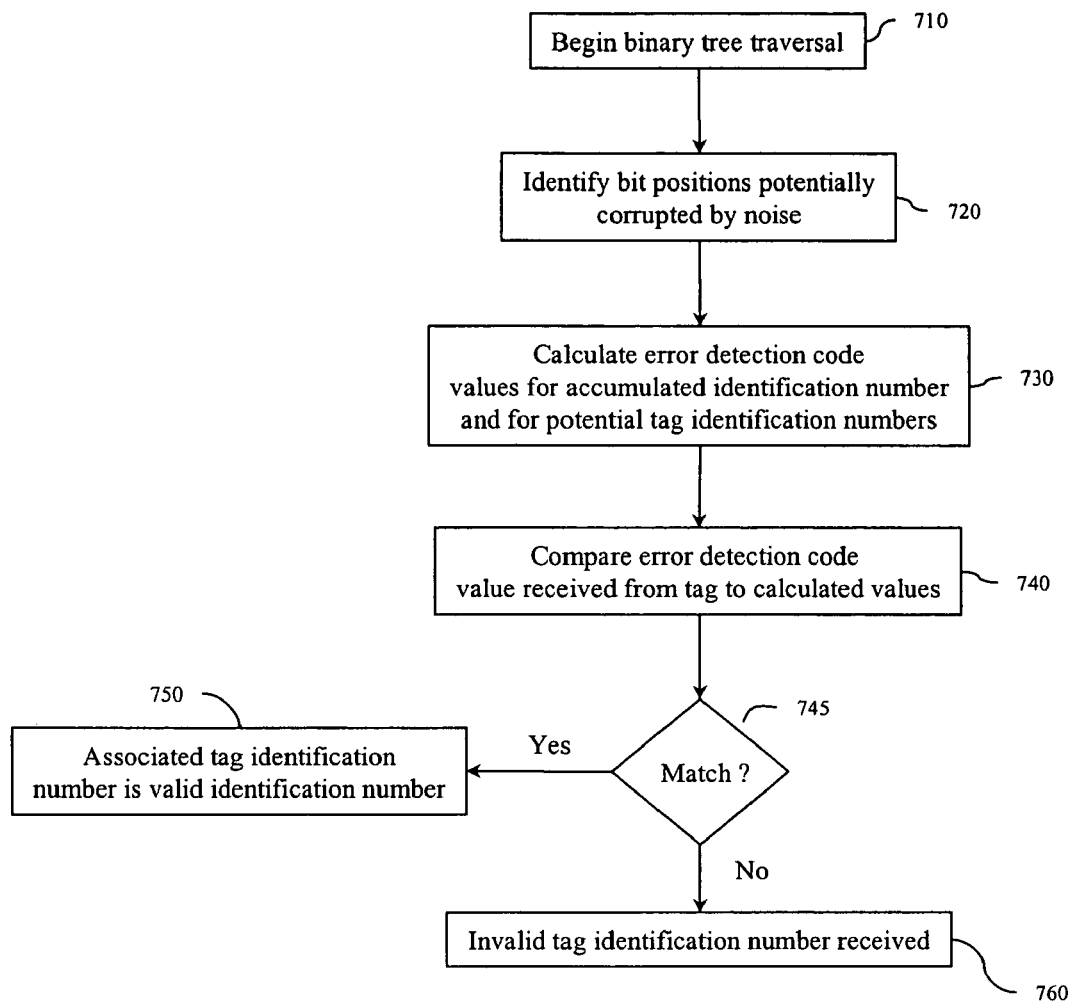
FIG. 7 is a flowchart depicting a method of using error detection code processing to identify a tag according to an embodiments of the present invention.

FIG. 7 illustrates a flowchart 700 for using error detection code processing to identify a tag in the presence of errors introduced during communications between tag 102 and reader 104 according to an embodiment of the present invention. In an embodiment of the present invention, the error detection code processing is cyclic redundancy check (CRC) processing. As will be appreciated by persons skilled in the relevant art(s), flowchart 700 can be used in conjunction with tag population interrogation using traversal path weighting as described herein.

Flowchart 700 begins at step 710 when the reader begins communications with a tag 102 or a population of tags 120. In an embodiment, the communications can include a read process or another process where a tag 102 or multiple tags are not placed in a mute state during tag-reader communications. In step 720, the reader identifies bit positions potentially corrupted by noise. For example, when the reader receives both a "0" and a "1" symbol, the reader may identify the associated bit position as potentially corrupted. The reader may also use other available information such as length of the traversal path at the node or values of bit counters and activity node register to determine whether the bit position was corrupted by noise.

During communications, the reader accumulates an identification number that it assumes to be valid. Therefore, after step 720, the reader will have one assumed correct identification number and may also have identified one or more potentially valid identification numbers. Throughout this description, the assumed correct identification number is referred to as the read identification number.

In step 730, the reader calculates error detection code values for the read identification number and any potentially valid identification numbers.

In step 740, the reader then determines whether the error detection code value received from the tag matches any of the calculated error detection code values.

In step 745, if a match is found, operation proceeds to step 750. In step 750, the associated tag identification number is the valid identification number. In step 745, if no match is found, operation proceeds to step 760. In step 760, a valid identification number has not been identified and a subsequent read process may be performed, if desired.

Figure 8:
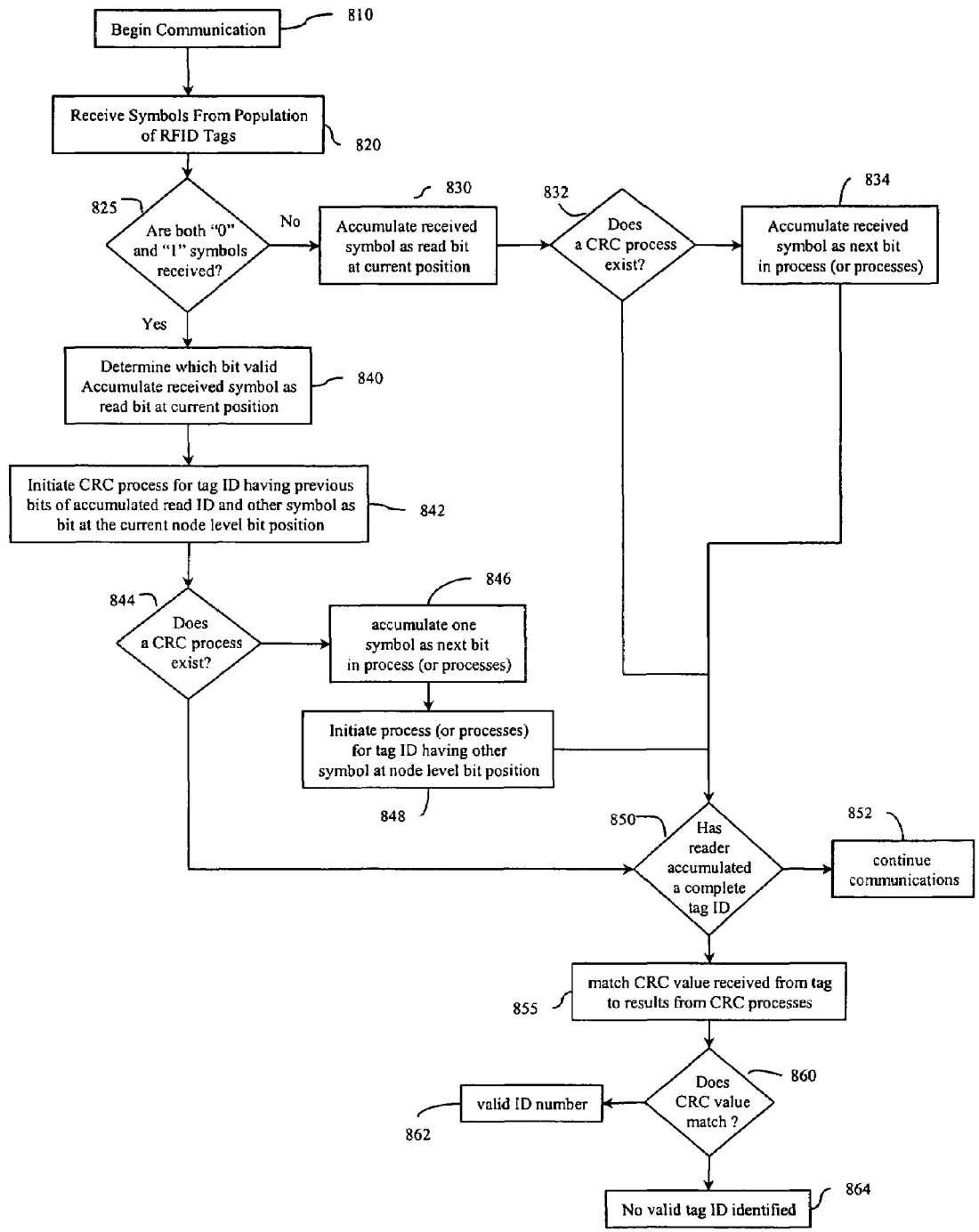
FIG. 8 is a flowchart depicting a method of using multiple error detection code processes to identify a tag according to an illustrative embodiment of the present invention.

As will be appreciated by persons skilled in the relevant art(s), various implementations of method 700 can be used without departing from the spirit or scope of the present invention. FIG. 8 illustrates a flowchart 800 of one potential implementation of flowchart 700 using multiple processes according to an embodiment of the present invention.

Flowchart 800 begins at step 810 when the reader begins communications with a tag 102 or tag population 120. In step 820, the reader receives one or more responses from the population of tags.

In step 825, the reader determines whether both a "0" symbol and a "1" symbol have been received. If both have been received, the reader assumes that the current bit position has been potentially corrupted by noise. In an alternate embodiment of the invention, the reader may also use additional node information stored in memory to determine whether bit position corrupted. In either embodiment, operation proceeds to step 840 when the reader determines that the bit position is potentially corrupted by noise.

If only one symbol was received (or the reader determines that bit position is not corrupted), operation proceeds to step 830. In step 830, the reader accumulates the received symbol in the read identification number bit stream at the current bit position.

In step 832, the reader determines whether any error detection code processes exist. An error detection code process is logic executing the error detection code algorithm for a single potential identification number. Thus, one process exists for each potential identification number. If one or more processes do exist, operation proceeds to step 834.

In step 834, the reader accumulates the read symbol as the next bit in the identification number being used in each process. Note that each error detection code process uses a unique identification number. If an error detection code process does not exist, operation proceeds to step 850.

In step 840, the reader makes a determination regarding which received bit is valid. Once the determination is made, in step 840, the selected bit is accumulated in the read identification number bit stream at the current bit position.

In step 842, the reader initiates a new error detection code process with a potential identification number having previous bits identical to read identification number bits and with the other symbol in the current bit position.

In step 844, the reader determines whether any error detection code processes exist. If one or more processes do exist, operation proceeds to step 846. In step 846, the reader accumulates one symbol as the next bit in the identification number being used in each existing process. In step 844, if no processes exist, operation proceeds to step 850.

In step 848, the reader initiates a new process derived from each existing process. Each new process has an identification number with previous bits identical to the identification number of the parent process and with the other symbol in the current bit position.

In step 850, the reader determines whether a complete tag identification number has been accumulated (referred to herein as the read identification number). If the read identification number is not complete, operation proceeds to step 852. In step 852, the reader continues communications. If the read identification number is complete, operation proceeds to step 854.

In step 854, the reader calculates an error detection code value for the read tag identification number that has been accumulated. In an alternate embodiment, the error detection code calculation for the read tag identification number occurs in parallel with the tag-reader communications.

In step 855, the reader attempts to match the error detection code value received from the tag to the calculated read error detection code value and the results of any error detection code process(es). In step 860, if a match is found, operation proceeds to step 862. In step 862, the identification number associated with the calculated error detection code value is identified as the valid tag identification number. In step 860, if no match is found, operation proceeds to step 864. In step 864, then no valid identification number has been found. Although steps 855 and 860 are described as distinct steps, they may be performed simultaneously. Following steps 862 and 864, the reader can resume communications.

In an alternate implementation of flowchart 700, the reader can store in memory each bit position that has been potentially corrupted. When the reader has accumulated a complete tag identification number, the reader can calculate error detection code values for the read identification number and each potential identification number corresponding to the corrupted bit positions. The reader can then compare the received error detection code values to the calculated error detection code value to identify the valid tag identification number.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for communicating with a plurality of radio frequency identification (RFID) tags, comprising:
   (a) receiving at least one symbol from the plurality of RFID tags for a first node in a binary tree having a plurality of nodes wherein each node in said binary tree is associated with a counter;
   (b) incrementing the counter associated with the first node in said binary tree when the at least one symbol received from said plurality of RFID tags matches a logical value associated with the counter;
   (c) decrementing the counter associated with the first node in said binary tree when the at least one symbol received from said plurality of RFID tags does not match the logical value associated with the counter; and
   (d) selecting a second node in said binary tree based on a value of the counter associated with the first node in said binary tree.

2. A method in a radio frequency identification (RFID) reader for interrogating a population of tags using binary tree traversal protocol, comprising the steps of:
   (a) entering a logical node in a binary tree;
   (b) transmitting a symbol to the population of tags;
   (c) determining if at least one symbol is received from the population of tags;
   (d) if it is determined in step (c) that at least one symbol has been received, determining whether one symbol received from the population of tags corresponds to a first logical value;
   (e) if it is determined in step (d) that one symbol received corresponds to a first logical value, incrementing a node counter value associated with the first logical value;
   (f) if it is determined in step (d) that one symbol received does not correspond to a first logical value, decrementing the node counter value associated with the first logical value;
   (g) if it is determined in step (c) that at least one symbol has been received, determining whether one symbol received from the population of tags corresponds to a second logical value;
   (h) if it is determined in step (g) that one symbol received corresponds to a second logical value, incrementing a node counter value associated with the second logical value;

(i) if it is determined in step (g) that one symbol received does not correspond to a first logical value, decrementing the node counter value associated with the second logical value;

(j) selecting which logical value to store as a bit of a tag bit pattern;

(k) storing the selected logical value as the bit of the tag bit pattern;

(l) determining whether the bit pattern is complete; and (m) if the bit pattern is not complete; proceeding to step (a).

3. The method of claim 2 wherein step (j) includes the steps of:

determining whether one symbol received from the population of tags corresponds to a first logical value and a second symbol received from the population of tags corresponds to a second logical value;

determining whether either symbol was likely caused by noise; and if it is determined it is likely that one received symbol was caused by noise, selecting the logical value associated with the other received symbol as the bit of the tag bit pattern.

4. The method of claim 3 wherein the step of determining the likelihood that either received symbol was caused by noise comprises:

evaluating the counter value associated with the first logical value and the counter value associated with the second logical value.

5. The method of claim 4 further comprising the step of:

if it is determined in step (c) that at least one symbol has been received from the population of tags, incrementing a node activity register value.

6. The method of claim 5 wherein the step of determining the likelihood that either received symbol was caused by noise further comprises:

retrieving the activity register; and evaluating the value of the activity register.

7. The method of claim 2 wherein step (j) includes the steps of:

determining whether one symbol received from the population of tags corresponds to a first logical value and a second symbol received from the population of tags corresponds to a second logical value;

determining whether either received symbol was likely generated by a weak tag; and if it is likely that one received symbol was generated by a weak tag, selecting the logical value associated with the one received symbol as the bit of the tag bit pattern.

8. The method of claim 7 wherein the step of determining the likelihood that either received symbol was caused by noise comprises:

evaluating the counter value associated with the first logical value and the counter value associated with the second logical value.

9. The method of claim 8 further comprising the step of:

if it is determined in step (c) that at least one symbol has been received from the population of tags, incrementing a node activity register value.

10. The method of claim 9 wherein the step of determining the likelihood that either received symbol was caused by noise further comprises:

retrieving an activity register; and evaluating the value of the activity register.

11. The method of claim 2 wherein the tag bit pattern contains a tag identification number.

12. The method of claim 11 further comprising:

if it is determined in step (1) that the tag bit pattern is complete, determining whether the stored bit pattern contains a valid tag identification number.

13. The method of claim 12 wherein each bit in the tag bit pattern corresponds to a logical node in the binary tree.

14. The method of claim 13 further comprising:

if the bit pattern does not contain a valid tag identification number, decrementing the node counters for the logical nodes corresponding to each bit in the tag bit pattern.

15. The method of claim 14 wherein the error detection code value is a cyclic redundancy code value.

16. The method of claim 2 further comprising:

if it is determined in step (c) that at least one symbol has not been received, decrementing the node counter corresponding to the last stored bit in the bit pattern.

17. The method of claim 2 wherein the first logical value is a data "0" and the second logical value is a data "1."

18. A method in a radio frequency identification (RFID) reader for interrogating a population of tags using binary tree traversal protocol, comprising the steps of:

(a) entering a logical node in a binary tree;

(b) transmitting a symbol to the population of tags;

(c) determining if at least one symbol is received from the population of tags;

(d) if it is determined in step (c) that at least one symbol has been received, adjusting traversal count information stored for the logical node based on the received at least one symbol;

(e) selecting which logical value to store as a bit of a tag bit pattern;

(f) storing the selected logical value as the bit of the tag bit pattern;

(g) determining whether the bit pattern is complete; and (h) if the bit pattern is not complete; proceeding to step (a).

19. A method in a radio frequency identification (RFIID) reader for interrogating a population of tags using binary tree traversal protocol. comprising the steps of:

(a) entering a logical node in a binary tree;

(b) transmitting a symbol to the population of tags;

(c) determining if at least one symbol is received from the population of tags: (d) if it is determined in step (c) that at least one symbol has been received, adjusting information stored for the logical node , wherein step (d) comprises:

(i) it is determined in step (c) that at least one symbol has been received, determining whether the at least one symbol received from the population of tags corresponds to a first logical value;

(ii) if it is determined in step (d)(i) that the at least one symbol received corresponds to the first logical value, incrementing a node counter value associated with the first logical value;

(iii) if it is determined in step (d)(i) that the at least one symbol received does not correspond to the first logical value, decrementing the node counter value associated with the first logical value; (iv) if it is determined in step (c) that at least one symbol has been received, determining whether the at least one symbol received from the population of tags corresponds to a second logical value;

(v) if it is determined in step (d)(iv) that the at least one symbol received corresponds to the second logical value, incrementing a node counter value associated with the second logical value; and (vi) if it is determined in step (d)(v) that the at least one symbol received does not correspond to the second logical value, decrementing the node counter value associated with the second logical value (e) selecting which logical value to store as a bit of a tag bit pattern;

(f) storing the selected logical value as the bit of the tag bit pattern;

(g) determining whether the bit pattern is complete; and (h) if the bit pattern is not complete: proceeding to step (a).

20. The method of claim 19 wherein step (d) further comprises the step of:

if it is determined in step (c) that at least one symbol has been received from the population of tags, incrementing a node activity register value.

21. A method in a radio frequency identification (RFID) reader for interrogating a population of tags using a binary tree traversal protocol, comprising the steps of:

reading a tag identification bit pattern as a result of a binary tree traversal interrogation of a tag in the population of tags;

receiving an error detection code from the tag;

identifying one or more bit positions in the read tag identification bit pattern potentially corrupted by noise;

identifying potential bit patterns having alternate bit values in one or more of the identified bit positions;

calculating an error detection code value for the accumulated tag identification bit pattern;

calculating an error detection code value for each identified potential bit pattern; and determining whether any of the calculate error detection code values matches the received error detection code.

22. A method in a radio frequency identification (REID) reader for interrogating a population of tags using binary tree traversal protocol, comprising the steps of:

storing data related to the tag population, wherein the tag population data includes node weighting information for each populated node in a binary tree;

during binary tree traversal, determining a traversal path based on the tag population data.

23. The method of claim 22 where the node weighing information includes:

a first stored counter value associated with a first logical bit value, and a second stored counter value associated with a second logical bit value; where step (1) comprises storing the first stored counter value and the second stored counter value for each population node.

24. The method of claim 22 further comprising:

obtaining at least some of the tag population data from a device external to the reader.

25. The method of claim 24 wherein the at least some of the tag population data is obtained from a second reader.

26. The method of claim 25 wherein the at least some of the tag population data is obtained from a database.

* * * * *

UNITED STATES PATENT AND TRADEMARK OFFICE
CERTIFICATE OF CORRECTION

PATENT NO. : 7,068,148 B2  Page 1 of 1
APPLICATION NO. : 10/687690
DATED : June 27, 2006
INVENTOR(S) : Shanks et al.

It is certified that error appears in the above-identified patent and that said Letters Patent is hereby corrected as shown below:

Column 16, line 59 (iv) should start on the next line in the same format as all of the small Roman numerals.

Signed and Sealed this

Thirtieth Day of January, 2007

JON W. DUDAS
*Director of the United States Patent and Trademark Office*